(12) United States Patent
Tung et al.

(10) Patent No.: US 11,913,830 B2
(45) Date of Patent: Feb. 27, 2024

(54) LASER ABSORPTIVITY MEASUREMENT DEVICE

(71) Applicant: National Technology & Engineering Solutions of Sandia, LLC, Albuquerque, NM (US)

(72) Inventors: Daniel Tung, Stanley, NM (US); Randal L Schmitt, Tijeras, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 332 days.

(21) Appl. No.: 17/522,123

(22) Filed: Nov. 9, 2021

(65) Prior Publication Data

US 2022/0146305 A1 May 12, 2022

Related U.S. Application Data

(60) Provisional application No. 63/112,509, filed on Nov. 11, 2020.

(51) Int. Cl.
 *G01B 11/06* (2006.01)
 *G01J 1/04* (2006.01)
 (Continued)

(52) U.S. Cl.
 CPC ........ *G01J 1/0429* (2013.01); *G01B 11/0625* (2013.01); *G01B 11/0641* (2013.01);
 (Continued)

(58) Field of Classification Search
 CPC ...... G01J 1/0429; G01J 1/44; G01J 2001/446; G01J 1/0418; G01J 2001/0481;
 (Continued)

(56) References Cited

U.S. PATENT DOCUMENTS 5,548,404 A * 8/1996 Kupershmidt ....... G01N 21/211
 356/369
6,621,060 B1 * 9/2003 Nantel .................. B23K 26/04
 250/201.4

(Continued)

OTHER PUBLICATIONS

Norris, J.T. et al., "Development of a Time-Resolved Energy Absorption Measurement Technique for Laser Beam Spot Welds," Welding Journal, vol. 89, No. 4 (2010), pp. 75s-81s.
(Continued)

*Primary Examiner* — Jonathan M Hansen
(74) *Attorney, Agent, or Firm* — Kevin W. Bieg

(57) ABSTRACT

A laser absorptivity measurement device uses a linearly polarized incident beam, an optical configuration comprising an internal polarizing beamsplitter that transmits the linearly polarized incident beam and a quarter-wave plate that converts linearly polarized incident beam into a circularly polarized incident beam that is reflected off a processing substrate. The quarter-wave plate and polarizing beamsplitter can then direct the reflected light back into an integrating volume, where the power of the reflected light can be measured by a photodetector. The laser absorptivity measurement device is capable of making real-time absorption efficiency measurements of a variety of laser-based processes, including laser welding and brazing, additive manufacturing, and laser marking.

7 Claims, 6 Drawing Sheets

(51) Int. Cl.
  *G02B 27/28* (2006.01)
  *G02B 5/30* (2006.01)
  *G01J 1/44* (2006.01)

(52) U.S. Cl.
  CPC .............. *G01J 1/44* (2013.01); *G02B 5/3083* (2013.01); *G02B 27/283* (2013.01); *G02B 27/286* (2013.01); *G01J 2001/446* (2013.01)

(58) Field of Classification Search
  CPC ............ G01B 11/0625; G01B 11/0641; G01B 5/3083; G01B 27/283; G01B 27/286
  See application file for complete search history.

(56) References Cited

U.S. PATENT DOCUMENTS

| | | | |
|---|---|---|---|
| 2015/0190882 A1* | 7/2015 | Ruettimann | H01S 3/0064 |
| | | | 219/121.61 |
| 2022/0152731 A1* | 5/2022 | Matsuoka | B23K 26/0608 |
| 2022/0380896 A1* | 12/2022 | Zhao | H01L 21/67167 |

OTHER PUBLICATIONS

Simonds, B.J. et al., "Time-Resolved Absorptance and Melt Pool Dynamics during Intense Laser Irradiation of a Metal, "Physical Review Applied 10, 044061 (2018), pp. 044061-1-044061-14.

\* cited by examiner

LASER ABSORPTIVITY MEASUREMENT DEVICE

CROSS-REFERENCE TO RELATED APPLICATION

This application claims the benefit of U.S. Provisional Application No. 63/112,509, filed Nov. 11, 2020, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to the measurement of laser absorptivity during laser-based processes, such as laser welding and additive manufacturing, and, in particular, to a laser absorptivity measurement device.

BACKGROUND OF THE INVENTION

Laser-metal interactions are complex and transient during processes such as welding and additive manufacturing. First, when an incident beam interacts with a metal substrate such as a metal plate or powder bed, beam scattering is chaotic and leads to complicated heating and heat conduction. See C. D. Boley et al., *Appl. Opt.* 54(9), 2477 (2015). These interactions yield significantly different laser absorption efficiencies and therefore significantly different thermal scenarios. Second, when a melt pool forms, beam interactions with a conduction vs. keyhole energy transfer mode not only produce additional beam-substrate interactions, but different probabilities for defect formation. See R. Xiao and X. Zhang, *J. Manuf. Process.* 16(2), 166 (2014); and M. Maina et al., *Appl. Sci.* 8(12), 2364 (2018). The collapse of a keyhole, for example, is known to create porosity in laser welds due to the inability of gas to escape to the molten pool surface prior to rapid solidification. See S. Kou, *Welding Metallurgy*, John Wiley & Sons (2003). Particularly in additive manufacturing, defects resulting from keyhole collapse are problematic when comparing built densities to that of a wrought component; even intermittent keyhole porosity may have a profound effect on overall density of the entire part.

Norris et al. developed a method to characterize absorption efficiency during laser spot welding using two integrating spheres. See J. Norris et al., *Weld. J.* 89(4), 75s (2010). Back-reflections out of a primary integrating sphere via the opening for the incident beam were captured by a secondary sphere and determined to be critical for identifying conduction and keyhole energy transfer modes. Since additive manufacturing primarily operates in a conduction mode with a keyhole mode often producing defects, back-reflections were considered critical for using energy absorption measurements to determine defect events via keyhole collapse. Similar work was performed by Simonds et al. with a single integrating sphere setup where back-reflections were measured with a photodiode located in the weld head. See B. Simonds et al., *Phys. Rev. Appl.* (4), 044061 (2018). Measurements in this study were compared to calorimetric data and it was concluded that calorimetric data could underestimate absorbed energy due to mass ejection when a keyhole is present; however, the study still proposed that temporal features may lead to melt pool viscosity and molten metal density calculations.

Transients in absorption efficiency for laser-based processes such as laser welding and additive manufacturing may therefore indicate defect events via keyhole collapse—identification of which defect-forming mechanism leads to a defect is critical for determining how to eliminate such events. In-situ study of these defect events may lead to overall defect mitigation by power variations to prevent keyhole formation, which could use a variety of techniques including decreasing the nominal laser power such that keyhole formation is never reached or, if keyhole formation is consistently observed in specific locations, pre-programming power variations at regions of absorptivity increase to maintain a constant absorptivity and therefore constant energy transfer mode. Furthermore, accurate absorption efficiency measurements are critical for producing and validating accurate computational models of laser-based processes.

SUMMARY OF THE INVENTION

The present invention is directed to a laser absorptivity measurement device comprising: an optical configuration comprising a linearly polarized incident beam, an internal polarizing beamsplitter that transmits the linearly polarized incident beam, and a quarter-wave plate that converts the linearly polarized incident beam into a circularly polarized incident beam; an integrating volume comprising a photodetector; and a processing substrate that reflects and thereby reverses the handedness of at least a portion of the circularly polarized incident beam, resulting in a reverse circularly polarized reflected light; wherein the reverse circularly polarized reflected light passes back through the quarter-wave plate and is converted into a linearly polarized reflected light having linear polarization orthogonal to that of the linearly polarized incident beam, wherein the linearly polarized reflected light passes back into the internal polarizing beam splitter and is reflected into the integrating volume, wherein the power of the linearly polarized reflected light is measured by the photodetector.

BRIEF DESCRIPTION OF THE DRAWINGS

The detailed description will refer to the following drawings, wherein like elements are referred to by like numbers.

DETAILED DESCRIPTION OF THE INVENTION

Figure 1:
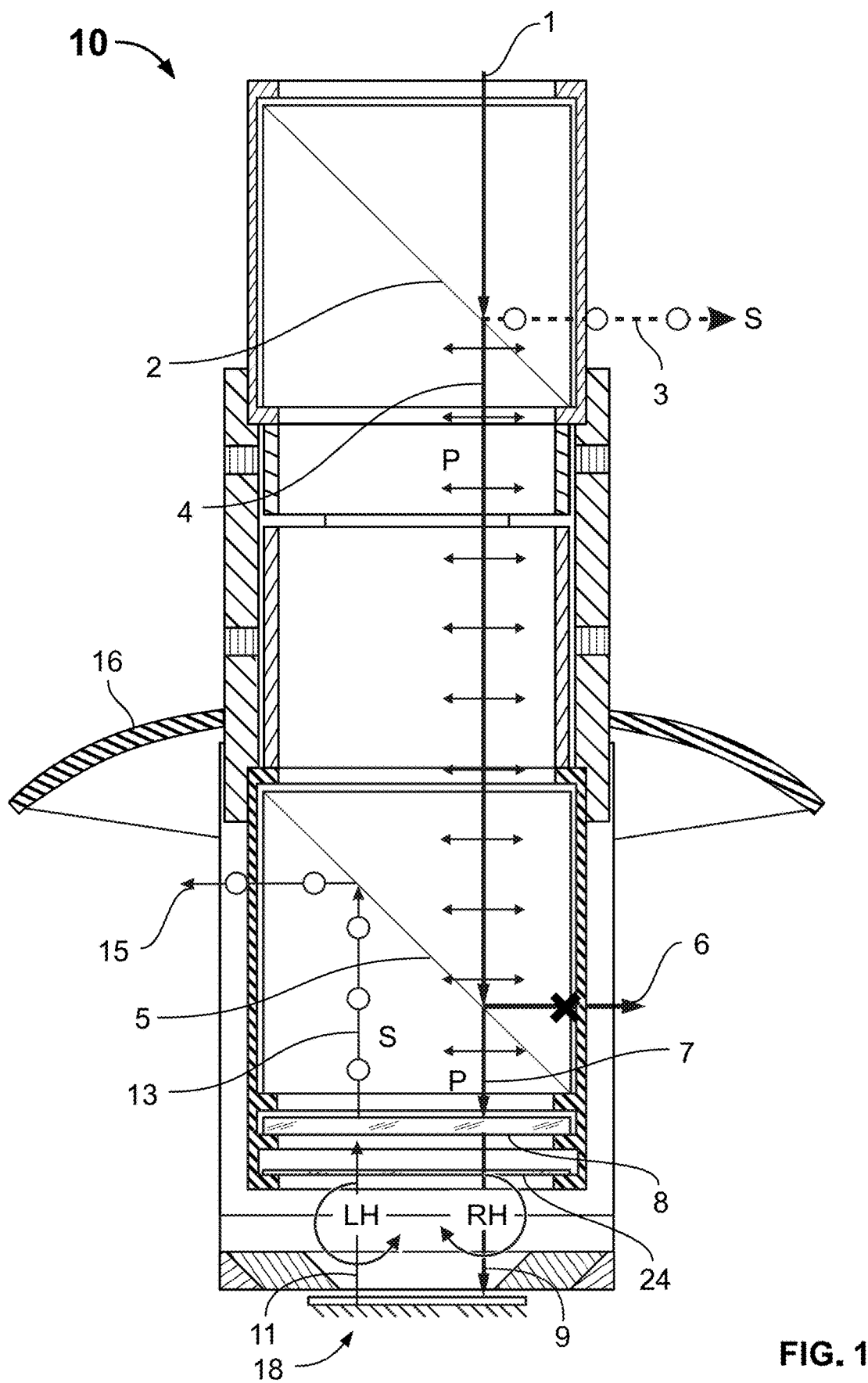
FIG. 1 is an illustration of the beam path through an optical configuration of the laser absorptivity measurement device.

The present invention is directed to a laser absorptivity measurement device capable of making absorption efficiency measurements while eliminating the number of experimental assumptions typically required by using a measurement setup nearly identical to actual additive manufacturing or laser welding setups, thereby enabling studies of these processes that can include real-world scenarios in place of simulative experimental configurations. A schematic illustration of the beam path traveling through an exemplary optical configuration 10 for the laser absorptivity measurement device is shown in FIG. 1. To prevent the reflected component of the laser beam from leaving the integrating volume through the entrance hole, an optical diode comprising at least one polarizer and a quarter-wave plate can be used, as described below.

An incident beam 1 from a laser (for example, a fiber laser) can be polarized or unpolarized. If the incident beam 1 is not linearly polarized, an external polarizing beamsplitter 2 can be used to ensure light input into the integrating volume 16 is linearly polarized (P) for the optical diode to function as intended. A polarizing beamsplitter cube can be used instead of a conventional disc polarizer to allow handing of very high laser power beams that are randomly polarized (e.g., as are multimode fiber lasers) for which back-reflections into the laser cavity are known to potentially cause equipment damage. The polarizing beamsplitter 2 reflects the unwanted polarization into a suitable beam dump. Therefore, unwanted light 3 having orthogonal linear polarization (S) to the desired transmitted light 4 is rejected to a beam dump. With a multimode fiber laser having unpolarized output as the incident beam 1, the rejected light is 50% of the total power. The incident beam is linearly polarized (P) to the orientation transmitted by the external polarizing beamsplitter 2, providing a linearly polarized incident beam 4.

The linearly polarized incident beam 4 reaches an internal polarizing beamsplitter 5 which is indexed with respect to the external polarizing beamsplitter 2 such that it has no effect on the linearly polarized incident beam 4 at this pass. The external polarizing beamsplitter 2, sometimes called a clean-up polarizer, is required with an unpolarized incident beam 1 due to three possible interactions of an incident unpolarized beam if the only polarizing beamsplitter were inside the integrating volume:
  a. If an incident beam interacts with a polarizing beamsplitter inside an integrating volume with no side wall, any unpolarized component will be turned into the dome volume and therefore artificially inflate measurements.
  b. If a high-powered incident beam interacts with a polarizing beamsplitter with a nonreflective fixtured side wall, an unpolarized component will heat and damage the side wall.
  c. If an incident beam interacts with a polarizing beamsplitter with a reflective fixtured side wall, an unpolarized component will reflect off the side wall and be subsequently turned into the laser cavity, potentially damaging the laser and interfering with the incident beam.

With this optical configuration, none of the linearly polarized incident beam 4 is rejected 6 due to its polarization already being in line with that transmitted by the internal polarizing beamsplitter 5. Accordingly, 100% of the linearly polarized incident beam 4 is transmitted 7 (100% P) through the internal polarizing beamsplitter 5.

A quarter-wave plate 8 is indexed with respect to the incident polarization P such that the transmitted linearly polarized incident beam 7 is converted into a (right-hand, RH) circularly polarized incident beam 9. The RH circularly polarized incident beam 9 reaches the processing substrate 18. Upon interaction with the processing substrate 18, the circularly polarized incident light 9 is either absorbed by the substrate, scattered directly into the integrating volume, or reflected back into the optical configuration. Light reflected back off the substrate 18 and back into the optical configuration reverses the "handedness" (e.g., right-hand, RH→left-hand, LH) of the reflected light 11. Since the reflected light 11 has a reverse circular polarization (LH), the quarter-wave plate 8 converts this reverse circularly polarized reflected light 11 to reflected light 13 that has orthogonal linear polarization (S) to the transmitted linearly polarized incident beam 7.

The linearly polarized (S) reflected light 13 reaches the internal polarizing beamsplitter 5. Since the linearly polarized reflected light 13 is orthogonal (S) to the incident polarization (P) of the linearly polarized light 7 transmitted by the internal polarizing beamsplitter 5, it is reflected by the beamsplitter 5 and turned into the integrating volume 16. Since all (100% S) of the reflected light 15 is turned by the beamsplitter 5 into the integrating volume 16, back-reflection escape of any reflected light from the integrating volume is prevented.

Figure 2:
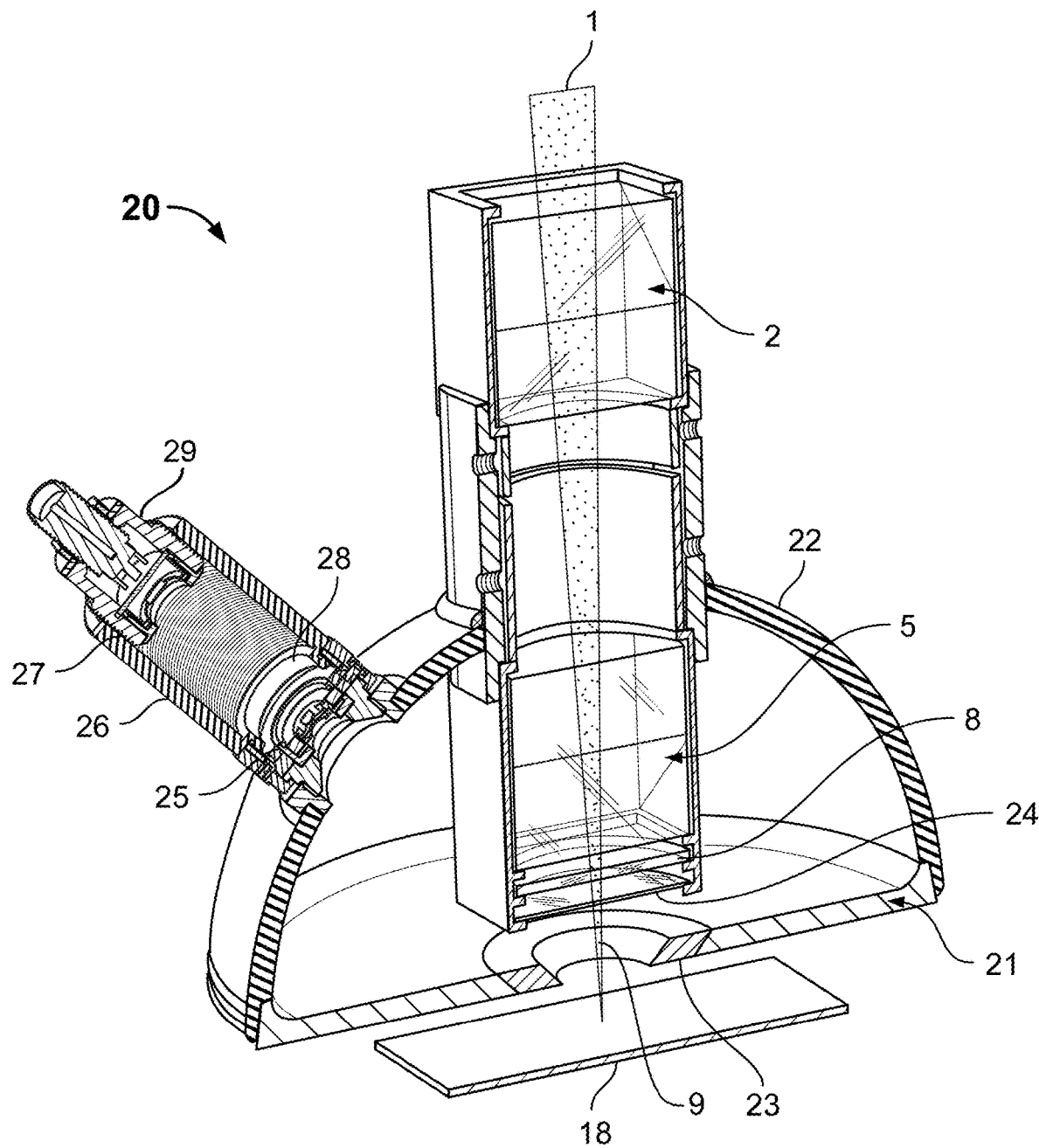
FIG. 2 is an illustration of an exemplary laser absorptivity measurement device.

An exemplary laser absorptivity measurement device 20 is illustrated in FIG. 2. This exemplary device 20 includes several operational considerations in addition to the optical configuration 10 discussed above. The integrating volume 16 can comprise a hemispherical dome 22 and a photodetector 29. A flat reflective baseplate 21 can be used to create an integrating hemispherical dome 22 rather than a full integrating sphere to allow the device 20 to be placed directly on the processing substrate 18—such as a powder bed or a weld sample—therefore avoiding the use of simulative samples restricted to geometries which fit inside an integrating sphere. For real-time measurements, the processing substrate 18 can be translated relative to the circularly polarized incident beam 9 and dome 22. Alternatively, the circularly polarized incident beam 9 and dome 22 can be rastered relative to a stationary processing substrate 18. A reflective adjustable insert 23 placed inside the dome 22 and around the circularly polarized incident beam 9 maximizes the reflective surface area by covering a portion of the laser processing substrate. Several inserts of various sizes can be used, depending on the size of the laser processing pattern to be used. As an example, all internal surfaces can be roughened (e.g., sandblasted, etc.) to produce a surface capable of Lambertian scattering, followed by a reflective plating or coating layer. An easily replaceable and optically transparent spatter shield 24 can be placed under the internal optical configuration to protect the carefully-aligned polarizing quarter-wave plate 8 from ejecta produced during processing.

Saturation of a cathode-grounded silicon photodiode (320-1100 nm wavelengths) detector 29 can be avoided by a combination of an adjustable iris 25, extension tube 26, and neutral density (ND) filters 27. Direct reflections into the photodiode 24 can be prevented by orienting the reflected light 15 turned by the internal polarizing beamsplitter 5 to be orthogonal to the photodiode 29 (as shown). Furthermore, the internal optical fixture can be lowered to physically interfere with any direct reflections from the sample at various angles. A notch filter 28 that transmits the wavelength of the reflected light 15 can be used to mitigate heated sample emissivity from reflected light measurements. A heated sample with a wide range of emitted wavelengths represents absorbed energy which would therefore interfere with reflected light measurements.

Device calibration can ensure both the optical components and the photodiode operate as intended. Therefore, optical calibrations can be performed using a low-powered desktop laser configuration before using the device with higher power lasers more representative of laser welding and additive manufacturing. Both polarizing beamsplitters and the quarter-wave plate can produce significant power losses if not indexed properly due to polarization misalignments. The quarter-wave plate requires indexing to the internal polarizing beamsplitter to ensure the largest possible beam fraction is converted to circularly polarized light and optical losses are minimized. This indexing can be achieved by polarizing an incident beam such that the polarization state is identical to that transmitted through the polarizing beamsplitter and measuring the power transmitted through the polarizing beamsplitter. The quarter-wave plate can then be placed inside the internal fixture and carefully rotated until power transmitted through the beamsplitter/quarter-wave plate combination is maximized. Both the polarizing beamsplitter and quarter-wave plate can then be fixed in place, e.g. with a UV-curable adhesive or other method. The external polarizing beamsplitter and internal optics setup can be indexed via locating features machined into the hemispherical dome itself to allow simple assembly and disassembly of the optical fixtures.

Figure 3:
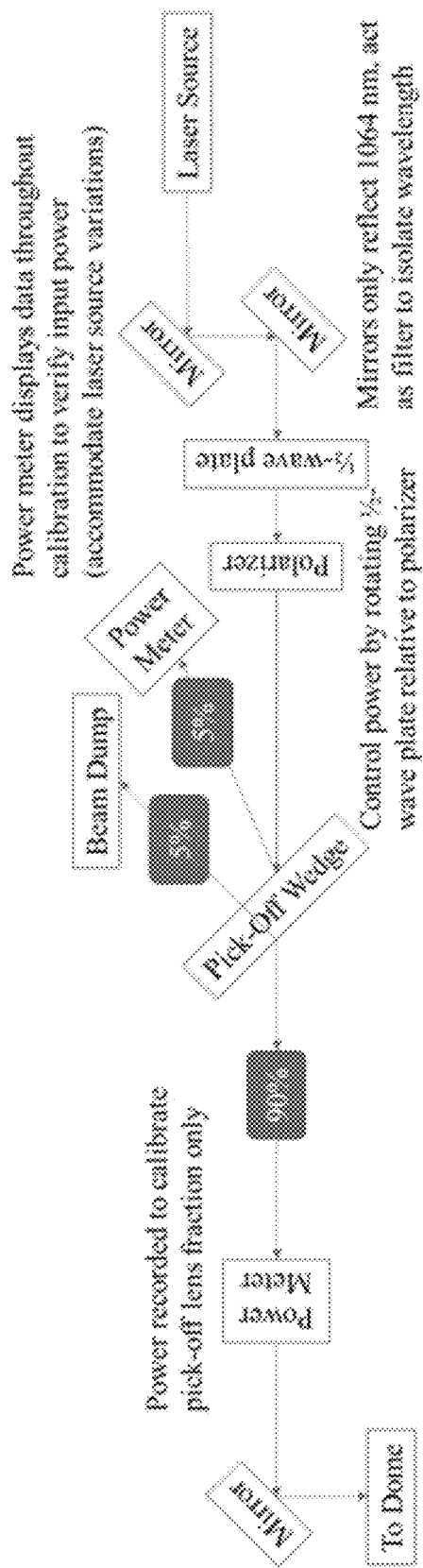
FIG. 3 is an illustration of the optical configuration for dome and photodiode calibration at low power.

Once optical alignment of the device is optimized, power losses of a polarized incident beam through the full optical setup can be measured through an optical calibration configuration shown in FIG. 3. In an exemplary optical calibration setup, a low-power diode-laser-pumped Nd:YAG microlaser can be used as the input source. A series of reflecting mirrors can be used to filter unwanted light from the microlaser and provide a dogleg for alignment to the device dome. A half-wave plate/polarizer combination can be used to allow arbitrary attenuation of the beam and therefore vary the laser power delivered to the dome. Beam power can then be controlled by rotating the half-wave plate relative to the polarizer and thereby adjusting the beam polarization alignment with that transmitted by the polarizer. In-situ power readings can be made via a clear uncoated fused silica wedge angled in the beam path to pick off a fraction of the incident beam power. As an example, one beam reflection was measured and, in combination with another commercial power meter directly in the beam path, was determined to represent approximately 5% of the total delivered beam power. This calibration setup can therefore deliver an adjustable laser intensity with the proper input polarization into the integrating dome. In particular, a calibrated pick-off allows measurement of the power input into the dome.

Figure 4:
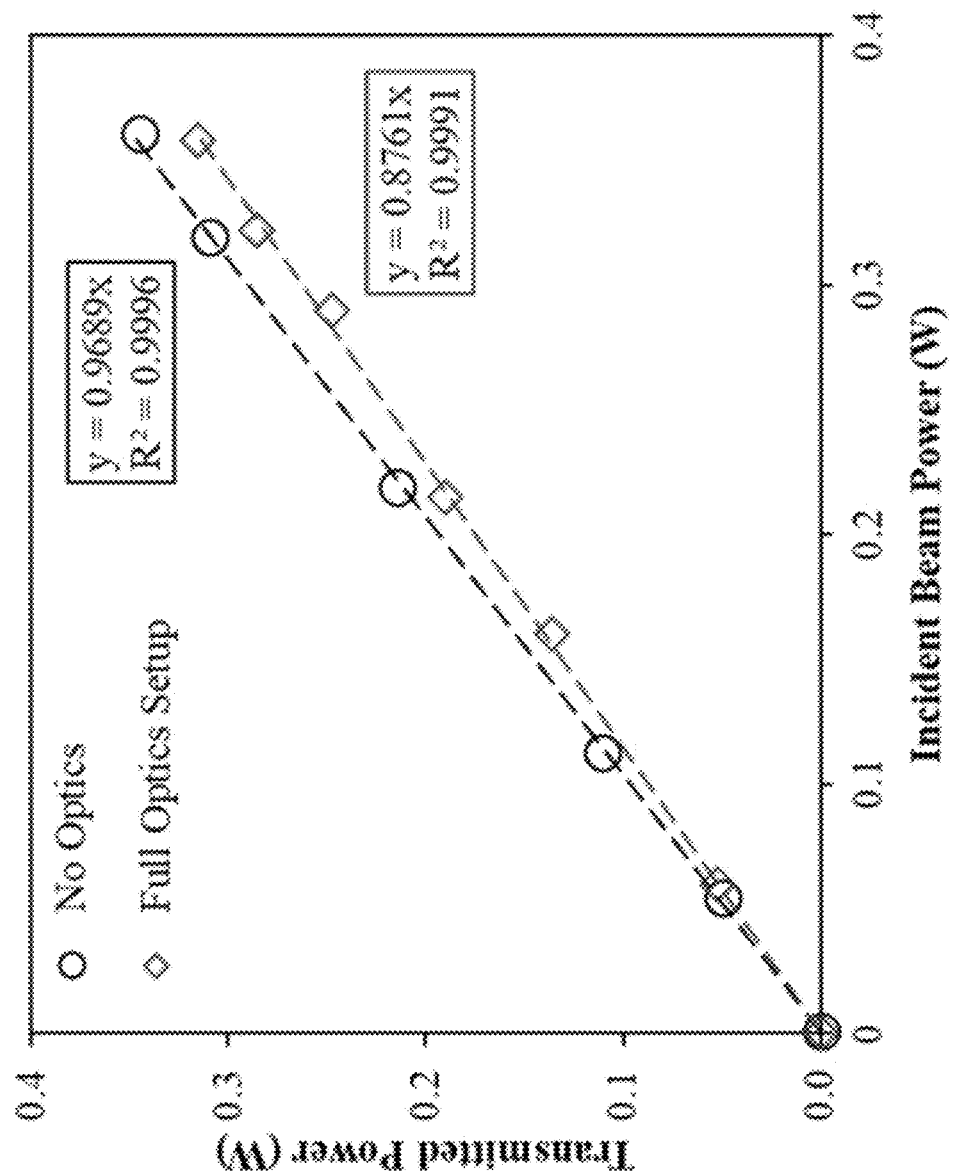
FIG. 4 is a graph of dome optical configuration power losses. Losses were determined to be 9.6% based on slope deviation with optics in place. The optical configuration produced a linear response as power was varied.

Using this calibration setup, the dome optical configuration (labeled "Full Optics Setup") losses were determined to be approximately 9.6% compared to the input power (labeled "No Optics"), as shown in FIG. 4. These losses were not found to change with incident beam power, producing linear transmitted power curves with good determination coefficients ($R^2$=0.9996 vs. 0.9991). Therefore, incident laser beam power losses due to the optical configuration are minimal. Further, since these losses are inherent to the optics setup, they do not effect measurements if photodiode calibration is performed correctly. However, the input power needs to be adjusted to ensure the incident beam power matches that intended. Furthermore, these losses increase as incident beam polarization angle or randomization varies from that transmitted by the polarizing beamsplitters.

Figure 5:
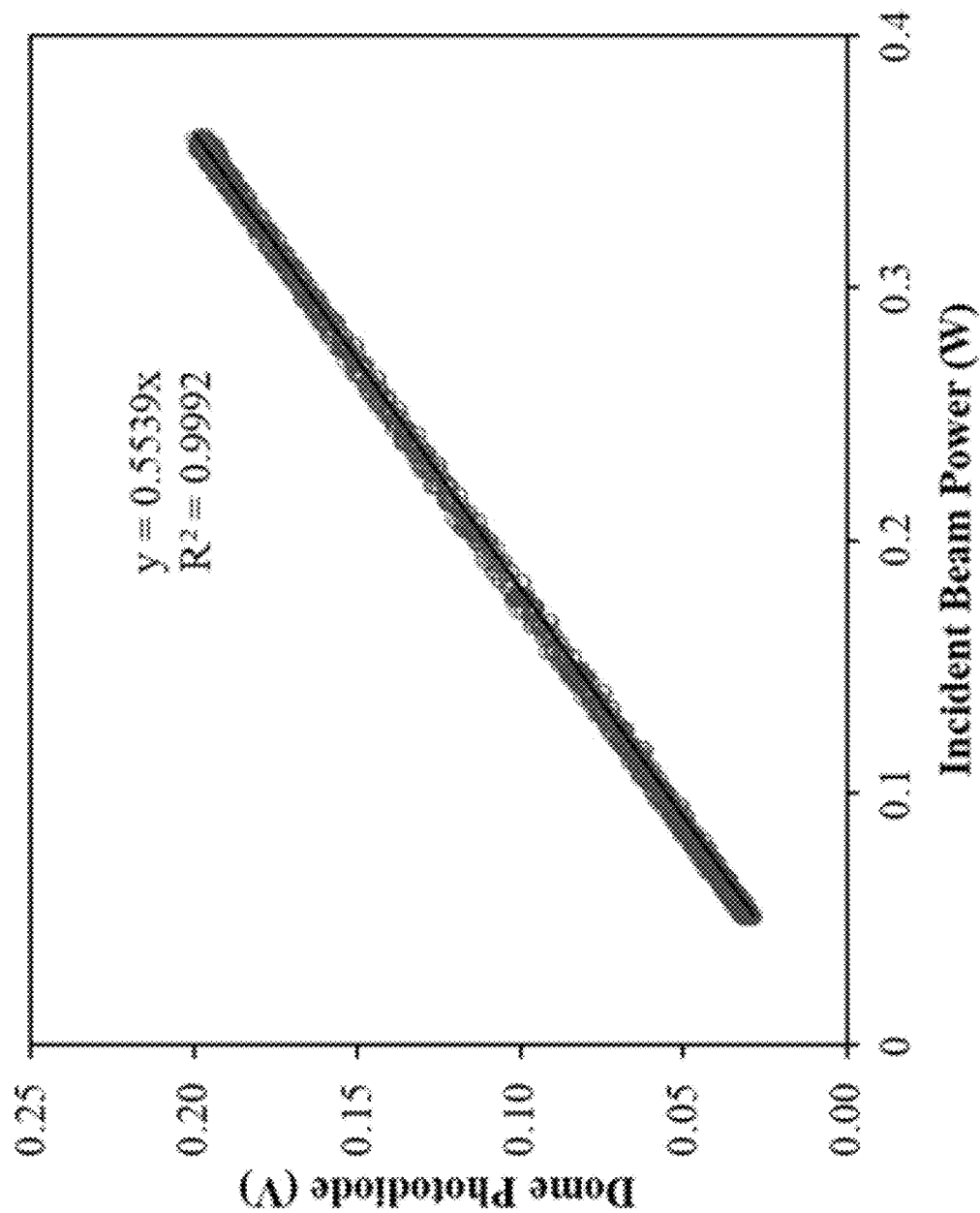
FIG. 5 is a graph of dome photodiode response validating linear behavior of the entire system at low power.

Photodiode linear response verification was accomplished by using the full optics calibration configuration described above. Power measurements with a commercial power meter placed in the dome baseplate opening were compared to photodiode measurements with an $Al_2O_3$ disc in the dome baseplate opening. The $Al_2O_3$ disc was used as a reflective surface producing Lambertian scattering similar to that expected from a powder bed. In this setup, a half-wave plate was rotated to produce continuously variable input power. As shown in FIG. 5, the incident beam power extrapolated to zero with a determination coefficient representing good linear response of the photodiode over the entire power range tested ($R^2$=0.9992). Alternatively, other types of photodetectors known in the art can be used to measure the reflected light.

Figure 6:
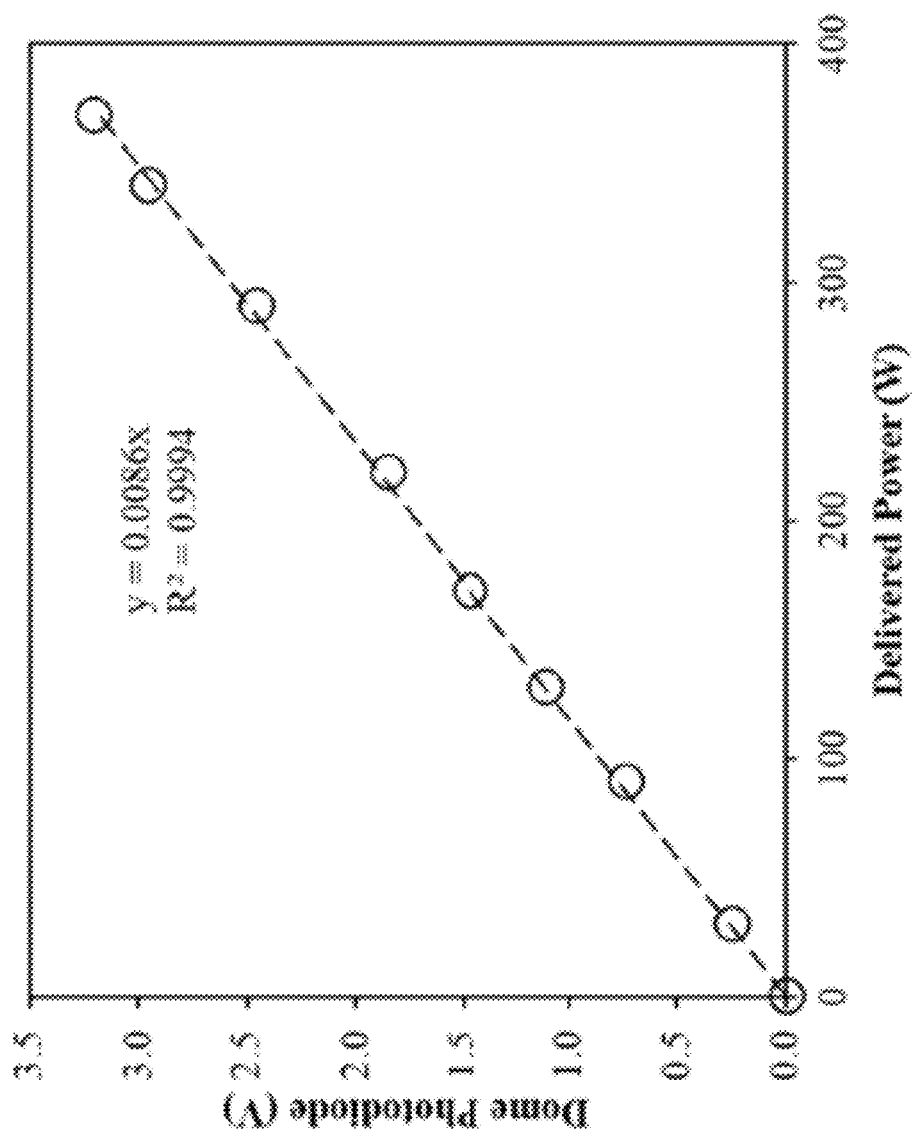
FIG. 6 is a graph of dome photodiode response validating linear behavior of the entire system at powers more representative of laser welding and additive manufacturing. This test used a 1.0 ND filter and a 0.5 ND filter in series to attenuate the reflected light which reached the photodiode.

The low-power test was then repeated with powers more representative of laser welding and additive manufacturing. The low-power test shown in FIG. 5 used two 0.3 ND filters in series to attenuate the reflected light reaching the photodiode. The high-power test used a 1.0 ND filter and a 0.5 ND filter in series. Furthermore, the low-power test used a DC power source to supply a diode reverse bias of 17V to the photodiode while the high-power test used a 9V battery to supply a reverse bias of approximately 9.25V as measured by a multimeter. Since power could not be continuously varied on this exemplary laser system, multiple independent points were chosen with power measurements compared to in-situ delivered power measurements. As shown in FIG. 6, these high-power measurements again produced a good determination coefficient ($R^2$=0.9994) representing good linear response over the entire power range tested. The line slope differs from the low-power test due to a different reflected light attenuation configuration to avoid diode saturation.

The laser absorptivity measurement device of the present invention can be used to improve the understanding and characterization of existing materials and processes as well as lead to enhanced performance/properties through defect mitigation via process control. Data from similar processes for stationary heat source laser welds has successfully been used by prior authors to identify defect prone melt pool modes and therefore identify process optimizations such as heat-affected zone minimization. This invention can expand these process optimizations to include moving heat sources, additional processing substrates such as a powder bed, and additional laser processes. The device can also be used to acquire absorptivity measurements of a variety of scan patterns, incident laser beam powers, and powder layer thicknesses. In combination with the high-resolution temporal data obtained with this device, scan pattern information can provide spatial defect data. Based on these results, micro-computed tomography can then be used to confirm that defects present at the precise locations detected were formed via keyhole collapse and not from any other defect mechanism. The correlation of scan patterns, incident laser beam power, and layer thickness with keyhole defect presence can suggest a variety of mitigation options, including:

1. Processing parameters such as scan pattern discovered to produce these defects can be avoided.
2. Processing parameters such as baseline incident laser beam power can be decreased to prevent the thermal build-up at specific scan pattern locations, such as turn-around points, combined with preventing the incident laser beam power from exceeding the threshold to produce a keyhole energy transfer mode.

3. Processing parameters, such as instantaneous incident laser beam power and instantaneous scan speed, can be altered at specific scan pattern locations to produce an altered absorption efficiency and thereby decrease the absorbed laser energy to avoid keyhole formation on a location-specific basis.

The compact, high-throughput laser absorptivity measurement device of the present invention can be used to characterize a variety of laser-based processes, such as laser welding, additive manufacturing, brazing, and laser marking. The invention expands on prior work by incorporating the following features simultaneously:

Captures back-reflections along the incident beam path through polarization manipulation of the incident and reflected beams to minimize escape back through the dome opening. To accomplish this, two polarizing beamsplitters and one quarter-wave plate are placed strategically in line with the incident laser beam and subsequent back-reflections.

Accommodates a moving heat source through its use of a single integrating volume and variable baseplate openings.

Accommodates actual processing substrates, such as hardware or a powder bed, through its hemispherical design with a reflective baseplate, allowing the device to be placed directly on the processing substrate.

Accommodates actual equipment for the process being studied.

Provides high resolution temporal data.

Finally, this device can be calibrated over a range of laser powers from the mW to kW scale, enabling its use for a large variety of laser-based processes.

The present invention has been described as a laser absorptivity measurement device. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A laser absorptivity measurement device, comprising:
an optical configuration, comprising
a linearly polarized incident beam,
an internal polarizing beamsplitter that transmits the linearly polarized incident beam, and
a quarter-wave plate that converts the linearly polarized incident beam into a circularly polarized incident beam;
an integrating volume comprising a photodetector; and
a processing substrate that reflects and thereby reverses the handedness of at least a portion of the circularly polarized incident beam, resulting in a reverse circularly polarized reflected light;
wherein the reverse circularly polarized reflected light passes back through the quarter-wave plate and is converted into a linearly polarized reflected light having linear polarization orthogonal to that of the linearly polarized incident beam, wherein the linearly polarized reflected light passes back into the internal polarizing beam splitter and is reflected into the integrating volume, wherein the power of the linearly polarized reflected light is measured by the photodetector.

2. The laser absorptivity measurement device of claim 1, wherein the integrating volume comprises a hemispherical dome.

3. The laser absorptivity measurement device of claim 1, wherein the photodetector comprises a photodiode.

4. The laser absorptivity measurement device of claim 1, wherein the optical configuration further comprises an external polarizing beamsplitter that transmits a preferred linear polarization and reflects unwanted polarizations of an incident beam, thereby providing the linearly polarized incident beam.

5. The laser absorptivity measurement device of claim 1, wherein the processing substrate comprises a laser welding, additive manufacturing, brazing, or laser marking process.

6. The laser absorptivity measurement device of claim 1, wherein the processing substrate can be translated relative to the circularly polarized incident beam.

7. The laser absorptivity measurement device of claim 1, wherein the circularly polarized incident beam can be rastered relative to the processing substrate.

* * * * *